US010293196B2

(12) United States Patent
Hammer (10) Patent No.: US 10,293,196 B2
(45) Date of Patent: May 21, 2019

(54) FLOW RATE MEASUREMENT DEVICE FOR A FIRE EXTINGUISHING APPARATUS

(71) Applicant: Rosenbauer International AG, Leonding (AT)

(72) Inventor: Hannes Hammer, Katsdorf (AT)

(73) Assignee: Rosenbauer International AG, Leonding (AT)

( * ) Notice: Subject to any disclaimer, the term of this patent is extended or adjusted under 35 U.S.C. 154(b) by 120 days.

(21) Appl. No.: 15/102,060

(22) PCT Filed: Dec. 5, 2014

(86) PCT No.: PCT/AT2014/050296
§ 371 (c)(1),
(2) Date: Jul. 15, 2016

(87) PCT Pub. No.: WO2015/085339
PCT Pub. Date: Jun. 18, 2015

(65) Prior Publication Data
US 2016/0346576 A1    Dec. 1, 2016

(30) Foreign Application Priority Data
Dec. 9, 2013 (AT) .............................. A 50809/2013

(51) Int. Cl.
*A62C 5/00* (2006.01)
*A62C 5/02* (2006.01)
(Continued)

(52) U.S. Cl.
CPC ................ *A62C 5/002* (2013.01); *A62C 5/02* (2013.01); *A62C 35/68* (2013.01); *G01F 1/28* (2013.01)

(58) Field of Classification Search
CPC ........... A62C 5/002; A62C 5/02; A62C 35/68; G01F 1/28; G01F 1/24; F04B 39/02;
(Continued)

(56) References Cited

U.S. PATENT DOCUMENTS 1,443,675 A  *  1/1923  Bowler ................. F04B 39/102
                                                    119/72.5
3,647,002 A  *  3/1972  Lindsay ................ B01F 5/0411
                                                        137/98

(Continued)

FOREIGN PATENT DOCUMENTS

CN         2189310 Y     2/1995
DE       26 26 786 A1   12/1977
(Continued)

OTHER PUBLICATIONS

International Search Report of PCT/AT2014/050296, dated Apr. 13, 2015.

*Primary Examiner* — Steven J Ganey
*Assistant Examiner* — Tuongminh N Pham
(74) *Attorney, Agent, or Firm* — Collard & Roe, P.C.

(57) ABSTRACT

The invention relates to a flow rate measurement device (1) for a fire extinguishing apparatus (2) for detecting the flow rate of extinguishing agent or fresh water, comprising a control element (9) arranged on a control rod (11), which control element (9) has a substantially conical section (22), and furthermore comprising a housing (25) surrounding the control element (9), the control element (9) being received in the housing (25) so as to be displaceable in the axial direction (31) of the control rod (11). The control element (9) further comprises a cylindrical subsection (23) which is positioned downstream of the conical section (22) as viewed in the flow direction (15) of the fluid to be measured, in which cylindrical subsection (23) of the control element (9) there is furthermore provided at least one recess (27) which (Continued)

interrupts the shell surfaces (28, 29) of the conical section (22) and the cylindrical subsection (23) of the control element (9).

16 Claims, 5 Drawing Sheets

(51) Int. Cl.
*G01F 1/28* (2006.01)
*A62C 35/68* (2006.01)

(58) Field of Classification Search
CPC . B05B 7/12; B05B 7/1254; F16K 1/34; F16K 1/54
USPC ...... 169/13, 14, 15; 239/569, 570, 583, 498, 239/505, 513, 512, 571; 251/120, 121, 251/122; 137/540, 625.3–625.37; 73/861.52–561.56
See application file for complete search history.

(56) References Cited

U.S. PATENT DOCUMENTS

| | | | |
|---|---|---|---|
| 3,876,009 A | 4/1975 | Johnson, Jr. | |
| 4,213,021 A * | 7/1980 | Alexander | F16K 37/0033 137/540 |
| 4,224,956 A | 9/1980 | Klein | |
| 4,417,601 A | 11/1983 | Bennett | |
| 4,886,367 A | 12/1989 | Bragg et al. | |
| 5,044,604 A * | 9/1991 | Topham | F16K 1/36 251/120 |
| 5,542,450 A | 8/1996 | King et al. | |
| 7,207,391 B2 | 4/2007 | Crabtree et al. | |
| 2004/0084192 A1 | 5/2004 | Crabtree et al. | |
| 2011/0174383 A1 | 7/2011 | Combs | |

FOREIGN PATENT DOCUMENTS

| | | |
|---|---|---|
| DE | 32 09 744 A1 | 9/1983 |
| DE | 38 33 055 A1 | 4/1990 |
| DE | 42 29 295 A1 | 3/1994 |
| DE | 196 01 609 A1 | 7/1997 |
| DE | 102 25 722 C1 | 12/2003 |
| DE | 20 2005 015 569 U1 | 3/2006 |
| DE | 20 2010 007 590 U1 | 8/2010 |
| EP | 1 041 369 A1 | 10/2000 |
| EP | 1 655 059 A2 | 5/2006 |
| JP | H 08-196658 | 8/1996 |
| JP | 2006-055400 A | 3/2006 |
| JP | 2007-003377 A | 1/2007 |
| JP | 2009-136432 A | 6/2009 |

* cited by examiner

FLOW RATE MEASUREMENT DEVICE FOR A FIRE EXTINGUISHING APPARATUS

CROSS REFERENCE TO RELATED APPLICATIONS

This application is the National Stage of PCT/AT2014/050296 filed on Dec. 5, 2014, which claims priority under 35 U.S.C. § 119 of Austrian Application No. A 50809/2013 filed on Dec. 9, 2013, the disclosures of which are incorporated by reference. The international application under PCT article 21(2) was not published in English.

The invention relates to a flow rate measurement device for a fire extinguishing apparatus and a fire extinguishing apparatus equipped with this flow rate measurement device as specified in claims 1 and 15.

A flow rate measurement device which operates as follows is known from the prior art. As extinguishing agent flows in the direction towards the extinguishing agent discharge line, the extinguishing agent flows past a control element. The control element is an element of a frustoconical design adjoining a control element seat provided in the form of a cylindrical bore. In order to guide the control element, the latter is fixedly connected to a control rod. The control element is pushed onto the control element seat by means of a spring element so that a contact surface is formed between the control element and control element seat. This contact surface preferably has a constant cross-sectional surface around the entire circumference. The pressure outlet to the extinguishing agent discharge line is separated by means of the control element. As the extinguishing agent is conveyed, the pressure at the pointed end of the control element increases. Due to this higher pressure than that prevailing in the extinguishing agent discharge line, the control element is moved by the through-flowing extinguishing agent in the direction of the flow direction. The control element is thus lifted off its control element seat, resulting in an annular cross-section, through which annular cross-section the extinguishing agent is able to flow in the direction towards the extinguishing agent discharge line. When there is an increase in the volumetric flow of extinguishing agent, the control element is forced through the annular cross-section farther in the direction of the flow direction by an amount directly proportional to the flow surface area, as a result of which the control rod is also moved farther in the direction of the flow direction. As the volumetric flow decreases, the control element is pushed by the spring element opposite the flow direction back in the direction towards the control element seat so that the annular cross-section through which the water flows is made smaller. The purpose of the control element respectively the control rod connected to it is to regulate an additive metering device. It may also be that the control element is used only to measure and electronically tap the flow quantity. As a result of this, additive can be metered into the quantity of extinguishing agent in such a way that the quantity of additive in the extinguishing agent as a percentage always remains constant, even if the flow rate of the extinguishing agent varies.

The disadvantage of the design known from the prior art is that compared with the maximum flow rate through the control cone, a range with a lower flow rate, for example double the flow rate, causes only a small control cone deflection and hence control rod deflection. This is particularly problematic because in order to keep the quantity of additive in the extinguishing agent constant, the additive metering device must double the quantity of additive and must therefore be such that it can be set very exactly.

U.S. Pat. No. 4,417,601 A discloses a proportioning valve for actively adjusting a flow quantity. The proportioning valve comprises a valve body having an inlet opening and an outlet opening. A stem is disposed in the valve body, which is configured to close the inlet opening. The stem is connected via an adjusting thread to a rotating knob by means of which the flow quantity can be adjusted. The flow quantity can be actively adjusted by means of the proportioning valve.

The objective of this invention is to propose an improved flow rate measurement device.

This objective is achieved by the invention on the basis of the features specified in claim 1.

The invention proposes a flow rate measurement device for a fire extinguishing apparatus for detecting the flow rate of extinguishing agent or fresh water. The flow rate measurement device comprises a control element arranged on a control rod, which control element has a substantially conical section, and furthermore comprising a housing surrounding the control element, which housing has a hollow cylindrical control element seat at least in a contact section with the control element, the control element being received in the housing so as to be displaceable in the axial direction of the control rod, the position of the control element essentially depending on how much extinguishing agent is flowing through the flow rate measurement device. The control element further comprises a cylindrical subsection which is positioned downstream of the conical section as viewed in the flow direction of the fluid to be measured, and which cylindrical subsection is adapted in terms of its cross-sectional contour to the hollow cylindrical control element seat so that the cylindrical subsection of the control element can be pushed into the hollow cylindrical control element seat substantially without a gap. Furthermore, at least one recess is provided in the cylindrical subsection of the control element which interrupts the shell surfaces of the conical section and of the cylindrical subsection of the control element.

One advantage of the design proposed by the invention is that due to the special geometry of the control element, the control deflection can be adapted to the requirements of an additive metering device whenever there is a change in the flow rate of extinguishing agent. By using the control element proposed by the invention, when the flow rate is low (for example 5% of the max. flow rate) compared with the maximum measurable flow rate, a change in flow rate is converted into a sufficient control deflection. This is achieved in particular due to the recesses provided in the cylindrical subsection of the control element. At a low flow rate of extinguishing agent, the latter flows only through the laterally disposed recesses. When there is a change in the flow rate of extinguishing agent, this leads to a sufficient control deflection because the recesses constitute only a fraction of the circumference of the control element. In the event of an increased flow rate which is big enough to lift the cylindrical section of the control element completely out of the control element seat and there is a flow through the entire circumferential contour of the control element, a change in flow rate will lead to a comparably low control deflection, as a result of which high flow rates can also be effectively determined. In summary, the advantage of this is that a curve plotting the correlation between flow rate and control deflection may have at least two different gradients.

Furthermore, the at least one recess may be provided in the form of a pocket extending parallel with the axial direction of the control rod. The advantage of this is that such a pocket is easy to manufacture and also has an optimum geometry in terms of fulfilling the desired function.

It may also be expedient to provide at least two diametrically opposite recesses. The advantage of a diametric disposition is that it results in good flow conditions in the flow rate measurement device. Furthermore, the forces acting on the control element tend to be symmetrical to a certain degree.

Furthermore, the cylindrical subsection may directly adjoin the conical section. The advantage of this is that the geometry can be kept as simple as possible, thereby minimizing the complexity of the manufacturing process.

It may also be expedient to provide the control element with a head section adjoining the cylindrical subsection in the form of a wider region, by means of which head section the degree to which the control element can be pushed into the control element seat is restricted. It is of advantage if the control element can be pushed onto the control element seat by means of a spring element and the head section acts as a stop.

Furthermore, the longitudinal extension of the cylindrical subsection of the control element is between 5% and 20% of the transverse extension of the cylindrical subsection of the control element. The advantage of this is that with this range of values, a desired ratio can be achieved between a high control deflection in the event of a change when the flow rate is low and a relatively low control deflection in the event of a change when the flow rate is high.

Also of advantage is a feature whereby the longitudinal extension of the conical section of the control element is between 100% and 200% of the longitudinal extension of the cylindrical subsection. The particular advantage of this is that the conical section ensures that the flow around the control element is positively affected. Especially within the specified range of values, the conical section of the control element has an advantageous shape which ensures that this is the case.

Furthermore, the control element may be connected to the control rod by means of a fixing element. As a result, the control element can be easily taken apart from the control rod, which makes maintenance of the flow rate measurement device easier.

It may also be expedient if the opening angle of the conical section between is 70° and 130°. This enables good flow conditions to be achieved in the flow around the control element.

It may also be of practical advantage if the recesses occupy between 5% and 60% of the unwound length of the cylindrical subsection on the control element. This enables the control behavior of the control element to be positively influenced and/or adapted accordingly to suit requirements. The unwound length may be equated to the circumference of the cylindrical subsection. The recesses form that part of the circumference which is interrupted.

Based on another advantageous embodiment, an axial extension of a recess in the cylindrical subsection is more or less the same size as a radial extension of this recess. The advantage of this is that the axial intake surface area of the recess through which the extinguishing agent flows is more or less the same size as that of the radial outlet surface area. What this means is that the flow speed at the intake of the recess is more or less the same as the flow speed at the outlet of the recess.

Furthermore, the at least one recess forms a connecting passage between the conical section and the cylindrical subsection of the control element. The advantage of this is that such a connecting passage can be used for the flow of extinguishing agent.

It may also be expedient if the connecting passage is radially open towards the end remote from the control rod. The advantage of this is that such a connecting passage is easy to manufacture because it can be produced using an end mill, for example.

Finally, the at least one recess forms a connecting passage having sections extending radially and axially with respect to the control element.

In this document, the expression extinguishing agent is used to refer both to fresh water mixed with additive as well as non-treated fresh water or service water. The reason for this is that it is not crucial to the function of the flow rate measurement device whether the volumetric flow being measured is water without additive or water mixed with additive. The only thing that is important in this respect is that the correlation between the flow rate and control deflection of the control element is adapted to regulation of the additive metering device so that a percentage-based proportion of additive can be added to the fresh or service water and that this percentage-based proportion always remains constant at different flow rates of extinguishing agent.

To provide a clearer understanding, the invention will be explained in more detail below with reference to the appended drawings.

These are highly simplified, schematic diagrams illustrating the following.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

FIG. 1 to FIG. 7 are various views and sections illustrating a flow rate measurement device 1 and essential components of a fire extinguishing apparatus 2 equipped with this flow rate measurement device 1.

Figure 1:
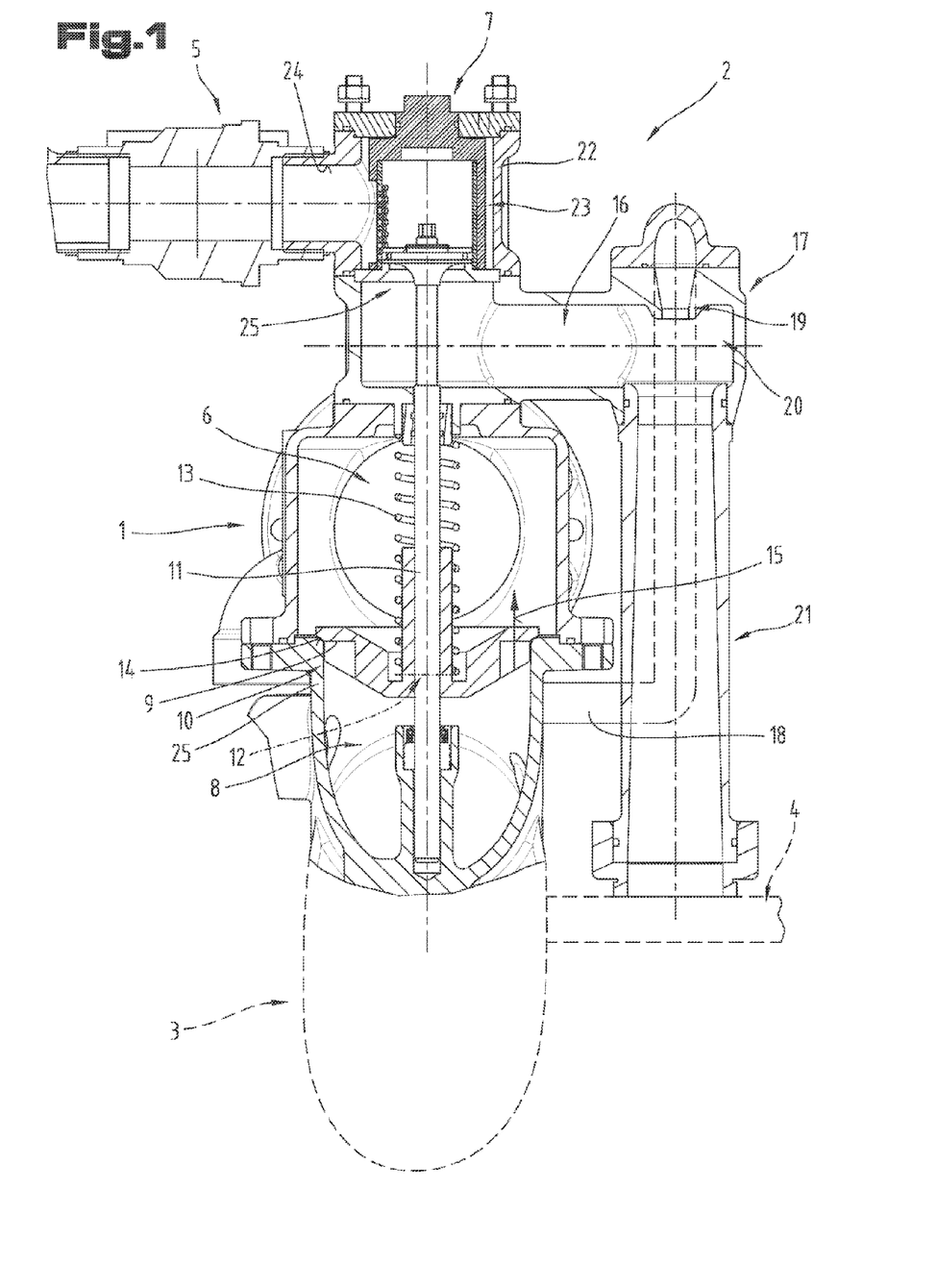
FIG. 1 a vertical section through a pump and a pre-mixing device of a fire extinguishing apparatus.

FIG. 1 illustrates a section through a flow rate measurement device 1, the design and operating mode of which will be described in more detail below. The flow rate measurement device 1 is integrated in a pre-mixing system which is part of a fire extinguishing apparatus 2. The fire extinguishing apparatus 2 further comprises a pump 3, which is only schematically indicated in this diagram in order to retain clarity, a schematically indicated water intake line 4, an additive intake line 5, an extinguishing agent discharge line 6 and an additive metering device 7.

The fire extinguishing apparatus 2 is essentially used to bring fresh water or service water to a higher pressure and simultaneously mix it with an additive. This additive is typically a foaming agent by means of which so-called extinguishing foam can be generated. To this end, fresh water or service water is mixed with an additive in the water intake line 4 and is sucked through a suction nozzle of a pump 3. In principle, the type of pump 3 used for this purpose is irrelevant in terms of fulfilling the requirements placed on a fire extinguishing apparatus 2. In practice, however, a centrifugal pump has proved to be the most suitable for obtaining a pressure level for conveying the medium at the pump outlet side.

Having been brought to the desired pressure level by means of the pump 3, the extinguishing agent arrives at the pressure outlet 8 of the pump 3. From the pressure outlet 8, the majority of the extinguishing agent flows in the direction of the extinguishing agent discharge line 6 and then to one or more spray heads or foam heads, not illustrated.

As the extinguishing agent flows in the direction towards the extinguishing agent discharge line 6, the extinguishing agent passes a control cone 9. The control element 9 is preferably a frustoconical element which sits on a control element seat 10 provided in the form of an at least partially cylindrical bore. The control element seat 10 is disposed on the side of the pressure outlet 8 remote from the pump 3. In order to guide the control element 9, the latter is fixedly connected to a control rod 11.

This connection between the control element 9 and control rod 11 is preferably a releasable connection by means of a fixing element 12. This is of particular advantage if maintenance work has to be carried out on the flow rate measurement device 1 and the latter has to be taken apart for maintenance purposes.

Alternatively, instead of a connection by means of a fixing element 12, it would also be possible to provide a material connection between the control element 9 and control rod 11. This might be a welded connection or a brazed connection, for example.

Based on another alternative, the control element 9 may be attached to the control rod 11 by means of a thread.

Based on another alternative, it is also possible for the control element 9 and control rod 11 to be cast as an integral part or produced by a mechanical process from a casting.

The control element 9 is pushed onto the control element seat 10 by means of a spring element 13, thereby creating a contact surface 14 between the control cone 9 and control element seat 10.

The pressure outlet 8 is separated from the extinguishing agent discharge line 6 by means of the control cone 9. As extinguishing agent is conveyed by the pump 3, the pressure at the pressure outlet 8 of the pump 3 increases. Due to this rise in pressure relative to the extinguishing agent discharge line 6, the control element 9 is moved in the direction of the flow direction—arrow 15—by the flow of extinguishing agent. The control element 9 is therefore lifted off its control element seat 10 creating an annular cross-section, through which annular cross-section the extinguishing agent is able to flow in the direction of the extinguishing agent discharge line 6.

The exact relationship between the extinguishing agent flow rate and the movement of the control element 9 and the design of the control element 9 proposed by the invention will be explained in more detail below.

As the volumetric flow of extinguishing agent increases, the control element 9 is pushed ever further in the direction of the flow direction—arrow 15—as a result of which the control rod 11 is also moved further in the direction of arrow 15. As the volumetric flow decreases, the control element 9 is pushed back by the spring element 13 in the direction opposite the flow direction 15 towards the control element seat 10. The positioning of the control element 9 and hence the control rod 11 relative to the pump housing and relative to the additive metering device 7 is therefore directly correlated with the extinguishing agent flow rate. The control rod 11 establishes a direct connection to the additive metering device 7, by means of which the additive is metered so that it can be mixed with service water or fresh water.

The additive is delivered to the additive metering device 7 via an additive intake line 5. In the additive metering device 7, the quantity of additive is metered on the basis of a desired proportion as a percentage of additive in the extinguishing agent and/or as a function of the quantity of extinguishing agent currently being conveyed.

Having been metered in the required and/or desired quantity, the additive leaves the additive metering device 7 and arrives at a connecting pipe 16. From connecting pipe 16, the additive flows into a water-jet pump 17 which generates the negative pressure necessary to suck the additive via the additive intake line 5 into the metering additive device 7 and connecting pipe 16.

The water-jet pump is based on the principle of a Venturi tube so that the water-jet pump operates in the following manner. Extinguishing agent from the pressure outlet 8 is branched off by means of a pressure pipe branch 18 and arrives at a nozzle 19 of the water-jet pump 17. The quantity of extinguishing agent branched off in pressure pipe branch 18 is much smaller than the quantity of extinguishing agent conveyed in the direction of the extinguishing agent discharge line 6. Since both branch lines are disposed at the pressure outlet 8, the pressure level of the medium in the pressure pipe branch 18 and in the extinguishing agent discharge line 6 is more or less equal. Consequently, the pressure in nozzle 19 of the water-jet pump 17 is also brought more or less to the pressure level of the extinguishing agent discharge line 6.

Having been pressurized, the extinguishing agent is then injected via the nozzle 19 into a suction chamber 20 of the water-jet pump 17. This pressurized injection of the extinguishing agent via the pressure pipe branch 18 delivering it into the suction chamber 20 creates a defined negative pressure in the suction chamber 20 due to the Venturi effect.

The suction chamber 20 is directly connected to the connecting pipe 16. Consequently, the resultant negative pressure sucks the additive out of connecting pipe 16 into the suction chamber 20. In the suction chamber 20, it meets the extinguishing agent jet delivered through nozzle 19 under pressure and is thus mixed with it. The additive mixture obtained as a result then passes via another connecting pipe 21 into the water intake line 4. As a result, the additive mixture is mixed with the fresh water and then passes into the suction-side intake of the pump 3.

The flow rate measurement device 1 may theoretically also be disposed in such a way that it measures the quantity of fresh water or service water delivered in the flow in the water intake line 4, for example. It may also be that the control element merely measures and electronically taps the flow quantity. In this case, another electronic system is provided as a means of controlling various additive metering devices.

FIG. 2 to FIG. 5 illustrate different views of control elements 9.

Figure 2:
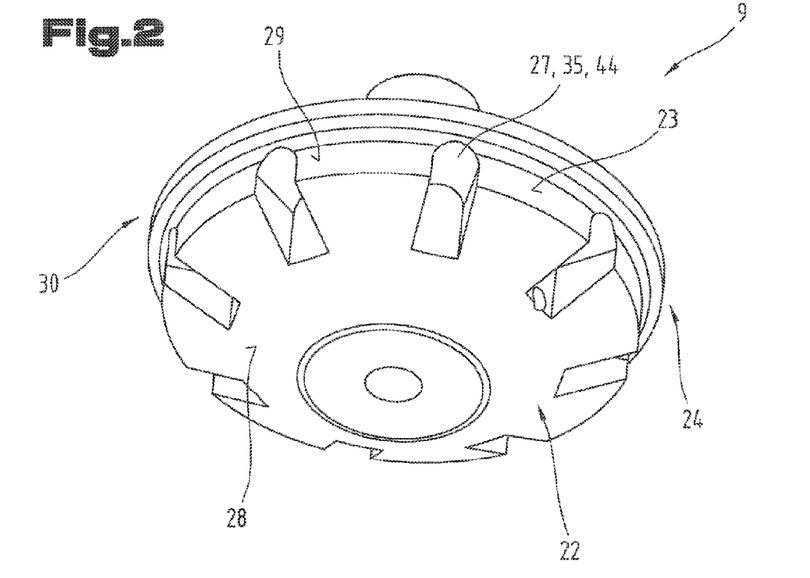
FIG. 2 a perspective view at an angle from underneath of a control element.

FIG. 2 is a perspective view illustrating a control element 9 viewed at an angle from underneath. The control element 9 comprises a conical section 22 and a cylindrical subsection 23. The cylindrical subsection 23 preferably directly adjoins the conical section 22. However, it would also be conceivable for an intermediate section of any other design to be incorporated between these two sections 22, 23. A head section 24 may also be provided, which extends radially out beyond the cylindrical subsection 23.

Figure 4:
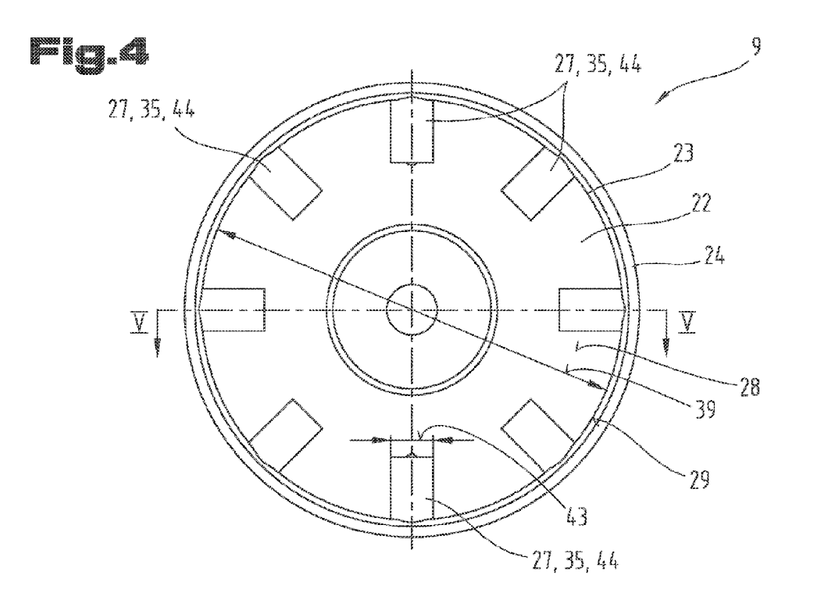
FIG. 4 a view of a control element from underneath.
Figure 5:
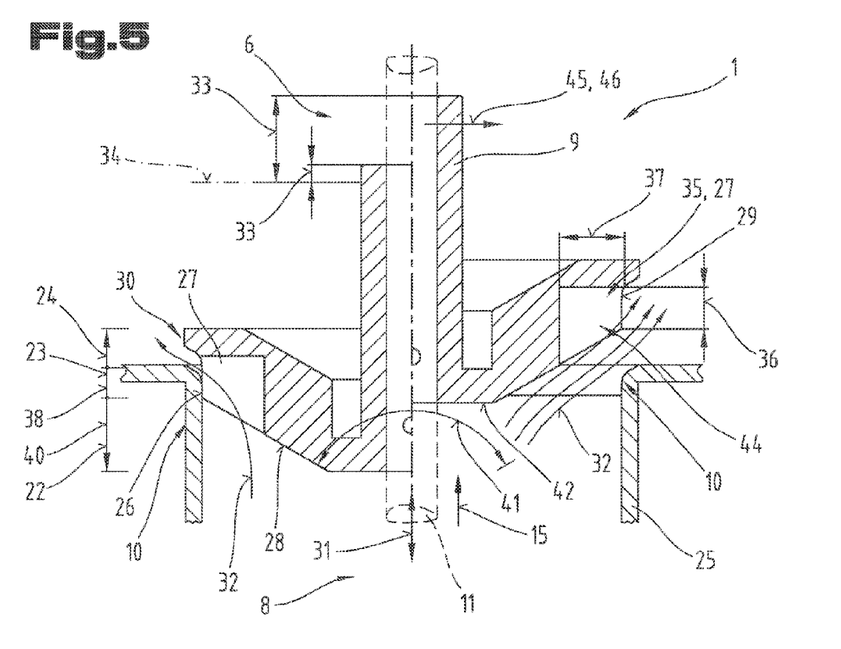
FIG. 5 a vertical section through a control element, in particular along section line V-V indicated in FIG. 4.

FIG. 5 clearly illustrates the way in which the control element 9 operates. FIG. 5 illustrates a vertical section through the control element 9, in particular along section line V-V indicated in FIG. 4. Also schematically illustrated is a housing 25 in which the control element 9 is accommodated. As may be seen, the control element 9, in particular a cylindrical subsection 23 of the control element 9, can be pushed into the housing 25.

By pushing the control element 9 into the housing 25, a contact section 26 is formed. This contact section 26 is formed due to the fact that the control element 9, in particular the cylindrical subsection 23 of the control element 9, sits tightly in contact with the housing 25. In this respect, it is preferable if the contour of the housing 25 matches the external contour of the cylindrical subsection. In order to guarantee functionality of the flow rate measurement device 1, it seems expedient to opt for a clearance fit for the contact section 26 in order to ensure that the control element 9 cannot become stuck or jammed in the housing 25.

In terms of the geometric shape of the cylindrical subsection 23 and/or the housing 25 surrounding it, it has proved to be of advantage from a manufacturing point of view if the cylindrical subsection 23 is provided in the form of a circular cylinder. However, it would also be conceivable for the cylindrical subsection 23 to be a cylinder with a polygonal, in particular rectangular or square, main surface.

As may also be clearly seen from FIG. 5, a recess 27 is provided, which interrupts the shell surface 28 of the conical section 22 and the shell surface 29 of the cylindrical subsection 23. In order to explain the function of the control element 9, it is illustrated in two different positions in FIG. 5. When the control element 9 is in a fully closed position as illustrated in FIG. 1, no water flows through the flow rate measurement device 1, as a result of which the deflection of the control element 9 and the control rod 11 connected to it is zero.

The left-hand section of FIG. 5 illustrates the control element 9 in a position which is slightly shifted in the flow direction 15. The flow direction 15 extends parallel with an axial direction 31 defined by the center line of the control rod 11.

The control element 9 has shifted due to the fact that water and/or extinguishing agent has been forced from the pressure outlet 8 of the pump 3 in the direction of the extinguishing agent discharge line 6. As a result of this build-up of pressure, the control element 9 together with the control rod 11 is pushed in the flow direction 15 opposing the spring force of the spring element 13. As the control element 9 is lifted slightly, the extinguishing agent is able to flow in the direction of flow arrow 32 through the recess 27.

The position of the control element 9 essentially depends on how much extinguishing agent is flowing through the flow rate measurement device 1.

The stroke 33 is used as a measure for the position of the control element 9. This measure defines the deflection or control deflection of the control element 9 in the direction of the flow direction 15 starting from a zero position 34.

In the case of the view illustrated in the left-hand section of FIG. 5, the stroke 33 is not only dependent on the quantity of extinguishing agent flowing through the flow rate measurement device 1 but also on the size and/or shape and number of recesses 27 provided on the control element 9. If more or larger recesses 27 are provided on the control element 9, the stroke 33 becomes shorter for the same flow quantity. This is a result of the fact that the flow speed of the extinguishing agent remains more or less constant. Accordingly, if the surface area across which the flow is freely able to pass is doubled by opting for a different arrangement of recesses 27 by providing twice the number of recesses 27, half the stroke 33 at the same volumetric flow may be enough to allow the quantity of extinguishing agent to flow through the flow rate measurement device 1.

Due to the fact that the surface area of the recesses 27 as viewed around the entire circumference of the control element 9 is quite small compared with the circumference of the cylindrical subsection 23, the control element 9 reacts to a change in the flow rate of the extinguishing agent with a relatively large control deflection or change in stroke 33. In other words, a slight change in volumetric flow results in a large control deflection or change of stroke 33.

The situation is different if the control element 9 is in the position illustrated in the right-hand section of FIG. 5. In this case, the control element 9 is lifted so far off the control element seat 10 due to a large extinguishing agent flow quantity that the extinguishing agent not only flows through the recesses 27 but also around the entire circumference of the control element 9, thereby resulting in an annular cross-section through which the extinguishing agent flows.

The flow around the entire circumference results in a large flow surface area and a change in the flow rate when the control element is in such a position will cause only a relatively small change in stroke 33.

The transition between a flow through the recesses 27 alone and a flow around the entire circumference of the control element 9 takes place with effect from the stroke 33 on which the cylindrical subsection 23 of the control element 9 is lifted off the contact section 26 of the control element seat 10 in the housing 25 and the latter are at a distance apart from one another.

The recess 27 is designed as a pocket 35 extending parallel with the axial direction 31 of the control rod 11. Such a pocket 35 may be produced by means of an end mill, for example. In order to obtain an optimum flow, it seems expedient to select an axial extension 36 of the recess 27 so that it is the same size as a radial extension 37. The extent of the recess 27 or pocket 35 is defined by these dimensions.

It may also be of advantage in terms of flow behavior if the longitudinal extension 38 of the cylindrical subsection 23 is between 5% and 20% of the transverse extension 39 of the cylindrical subsection 23.

Furthermore, the longitudinal extension 40 of the conical section 22 may be between 100% and 200% of the longitudinal extension 38 of the cylindrical subsection 23. This will result in an opening angle 41 of the conical section 22 of between 70 and 130°.

These values specified for the dimensions represent advantageous values at which flow losses due to turbulence, for example, are kept as low as possible. In order to save on manufacturing costs, it would also be conceivable for the conical section 22 of the control element 9 to be so small that the longitudinal extension 40 of the conical section 22 is only 0.5 to 1 mm, for example. In this case, the conical section 22 is merely a chamfer provided as a means of facilitating insertion of the cylindrical subsection 23 in the control element seat 10 as far as possible.

Based on such an embodiment, an end face 42 bounding the conical section 22 would extend virtually across the entire transverse extension 39 of the cylindrical subsection 23. In this connection, turbulence can be expected to occur in the flow in the region of the end face 42, which has a negative effect on the characteristic of the flow rate measurement device 1.

With regard to dimensioning of the control element 9, it is also of advantage if a width 43 of a recess 27 or pocket 35 has a size such that all of the recesses 27 together in total occupy between 5% and 60% of the unwound length or circumference of the cylindrical subsection 23 on the control element 9, as illustrated in FIG. 4.

The recess 27 should also be designed such that it forms a connecting passage 44 between the conical section 22 and the cylindrical subsection 23 of the control element 9. This connecting passage 44 is preferably such that it is open radially 45 towards the end 46 remote from the control rod 11.

Alternatively, the connecting passage 44 may be provided in the form of a bore, for example comprising two mutually connecting bores. This being the case, a first bore is made in the axial direction 31 through the shell surface 28 of the conical section 22. Another bore may be made in the radial direction 45 through the shell surface 29 of the cylindrical subsection 23. Where these two bores intersect inside the control element 9, they create a closed flow passage.

Figure 3:
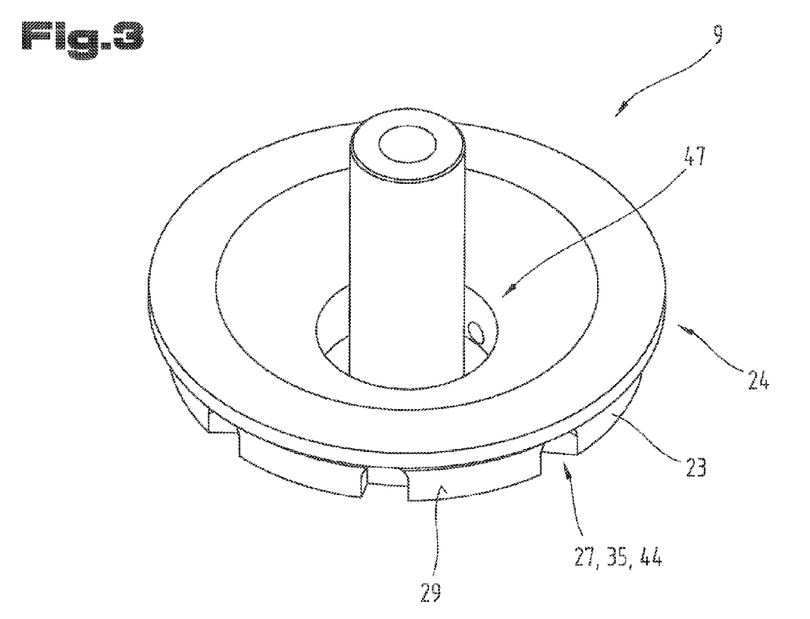
FIG. 3 a perspective view at an angle from above of a control element.

To save weight on the control element 9, a cut-out 47 may be provided on a remote end of the control element 9 as viewed in the flow direction 15, as illustrated in FIG. 3.

Figure 6:
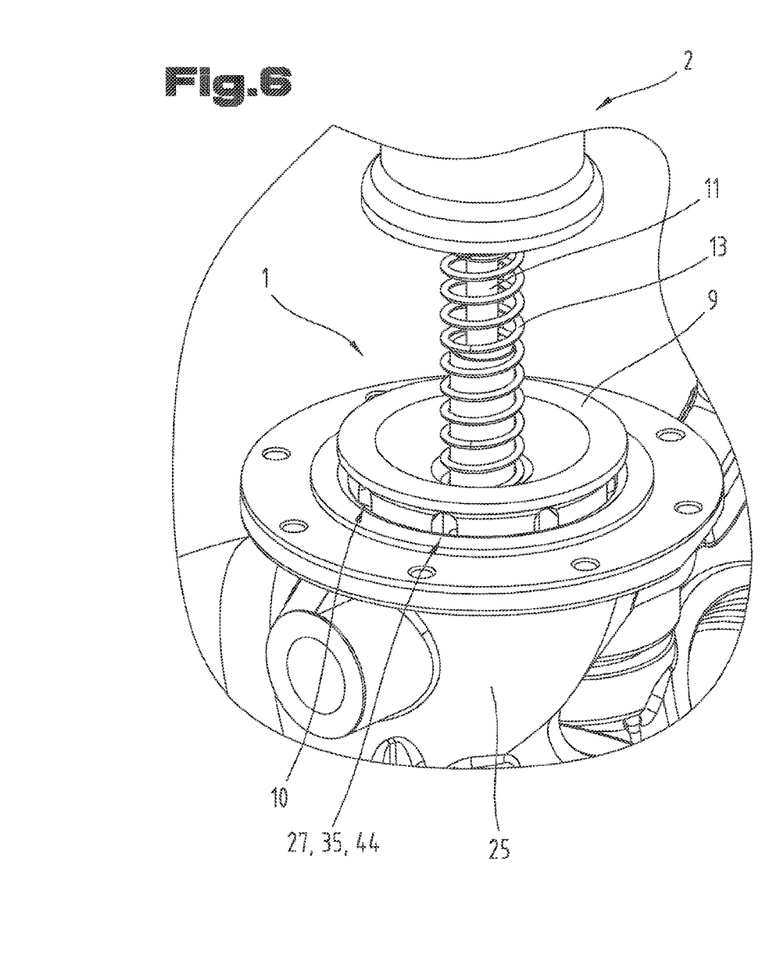
FIG. 6 a perspective view of an assembly of the housing and control element accommodated in it, the control element being in a slightly open position.
Figure 7:
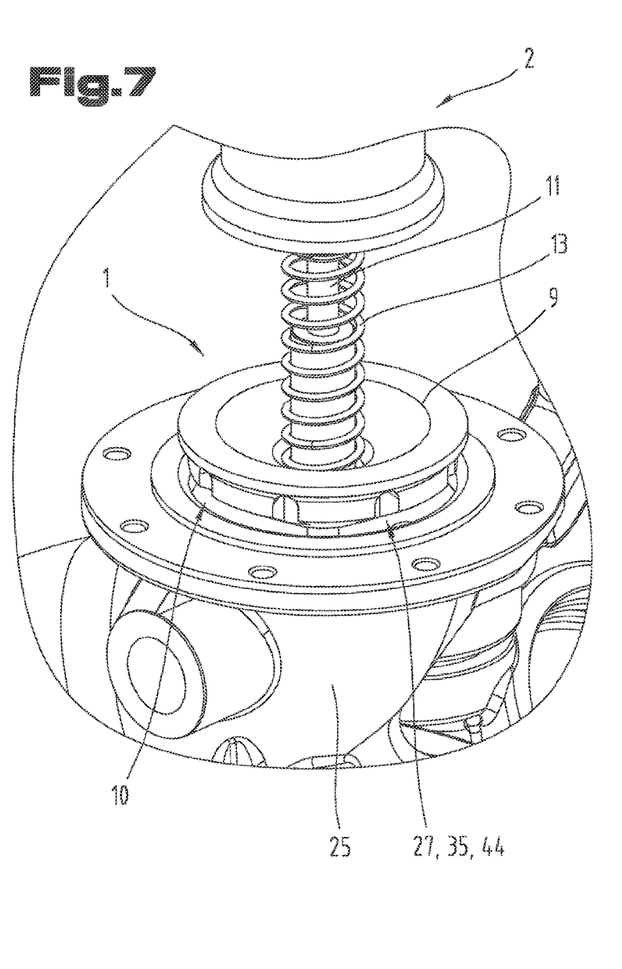
FIG. 7 a perspective view of an assembly of the housing and control element accommodated in it, the control element being in a wide open position.

FIGS. 6 and 7 are perspective views illustrating a control element 9 which is connected to a control rod 11 and which is pushed onto the control element seat 10 by means of a spring element 13. The control element 9 is thus received on the housing 25.

FIG. 6 illustrates a position of the control element 9 in which it has a small control deflection or stroke 33 due to the prevailing flow quantity of extinguishing agent so that the fluid flows solely through the recesses 27 distributed circumferentially around the control element 9.

By contrast with this, FIG. 7 illustrates the control element 9 with a control deflection or stroke 33 that is so large that a circumferentially extending annular cross-section is created, through which the extinguishing agent flows.

Figure 8:
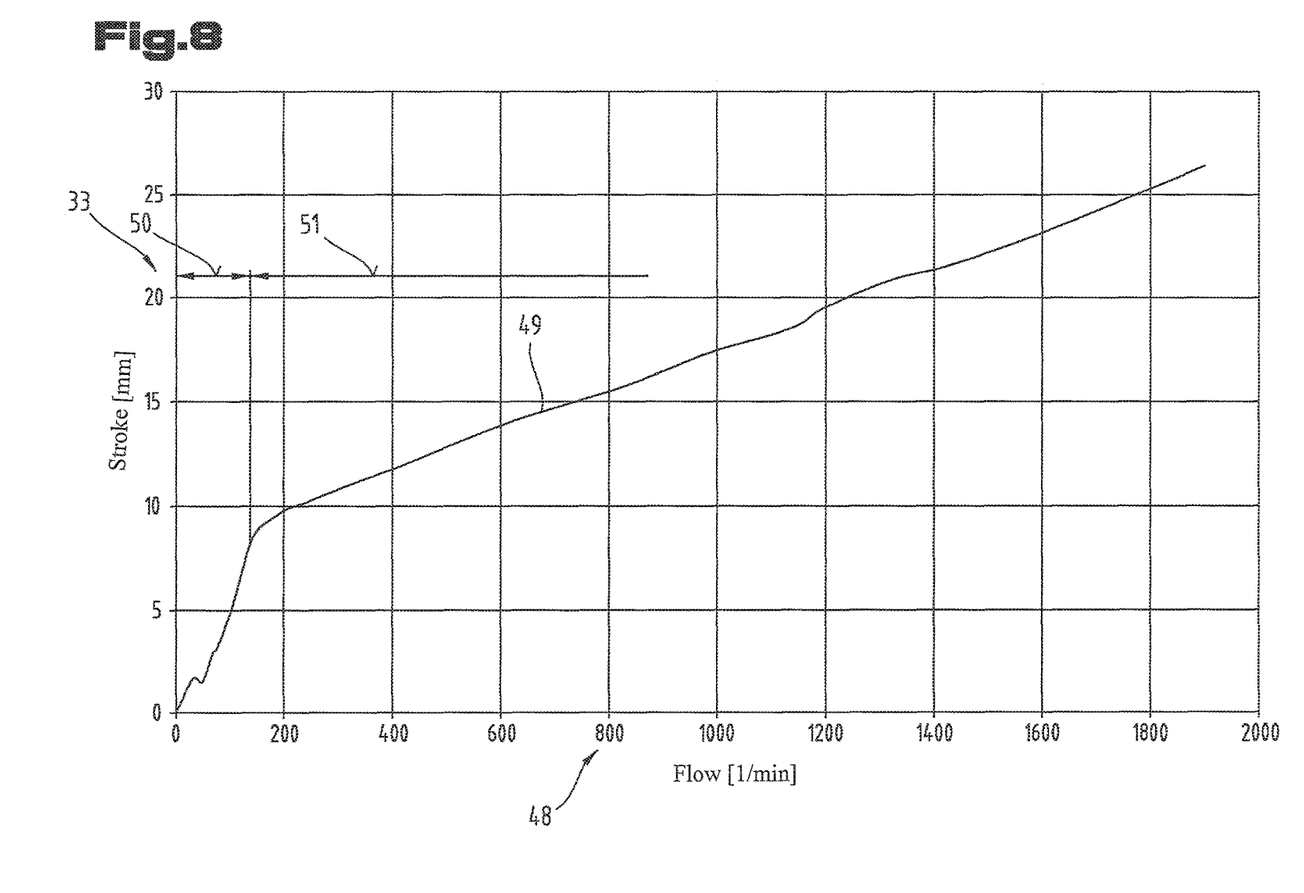
FIG. 8 a graph plotting the correlation between flow rate and stroke for an exemplary size of a described control element.

FIG. 8 is a diagram illustrating the correlation between the stroke 33 and the flow quantity 48. In this diagram, the stroke 33 is plotted on the ordinate and the flow rate 48 on the abscissa. As may be seen from the diagram, the control line 49 resulting from the correlation between stroke 33 and flow rate 48 is substantially split into a first section 50 and a second section 51.

The first section 50 of the control line 49 represents the state in which the cylindrical subsection 23 is disposed inside the control element seat 10 in the housing 25. This first section 50 depicts the point at which the fluid is flowing exclusively through the recesses 27, as illustrated in FIG. 6. As may be seen from this diagram, this results in a control line 49 with a steep gradient because a relatively small change in flow rate leads to a relatively large control deflection or change of stroke 33 of the control element 9.

The second section 51 represents the state in which the control element 9, as illustrated in FIG. 7, has already been lifted so far out of the housing 25 that fluid is flowing around the entire circumference of the control element 9. As a result, the control line 49 in the second section 51 has a less steep gradient because a relatively large change in flow rate leads to a relatively low control deflection or change in stroke 33 of the control element 9.

The embodiments illustrated as examples represent possible variants of the flow rate measurement device 1 and it should be pointed out at this stage that the invention is not specifically limited to the variants specifically illustrated, and instead the individual variants may be used in different combinations with one another and these possible variations lie within the reach of the person skilled in this technical field given the disclosed technical teaching.

Furthermore, individual features or combinations of features from the different embodiments illustrated and described may be construed as independent inventive solutions or solutions proposed by the invention in their own right.

The objective underlying the independent inventive solutions may be found in the description.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

Above all, the individual embodiments of the subject matter illustrated in FIGS. 1, 2 to 4, 5, 6 and 7 constitute independent solutions proposed by the invention in their own right. The objectives and associated solutions proposed by the invention may be found in the detailed descriptions of these drawings.

For the sake of good order, finally, it should be pointed out that, in order to provide a clearer understanding of the structure of the flow rate measurement device 1, it and its constituent parts are illustrated to a certain extent out of scale and/or on an enlarged scale and/or on a reduced scale.

| List of reference numbers | |
|---|---|
| 1 | Flow rate measurement device |
| 2 | Fire extinguishing apparatus |
| 3 | Pump |
| 4 | Water intake line |
| 5 | Additive intake line |
| 6 | Extinguishing agent discharge line |
| 7 | Additive metering device |
| 8 | Pressure outlet |
| 9 | Control element |
| 10 | Control element seat |
| 11 | Control rod |
| 12 | Fixing element |
| 13 | Spring element |
| 14 | Contact surface |
| 15 | Flow direction |
| 16 | Connecting pipe |
| 17 | Water-jet pump |
| 18 | Pressure pipe branch |
| 19 | Nozzle |
| 20 | Suction chamber |
| 21 | Other connecting pipe |
| 22 | Conical section |
| 23 | Cylindrical subsection |

-continued

| | List of reference numbers |
|---|---|
| 24 | Head section |
| 25 | Housing |
| 26 | Contact section |
| 27 | Recess |
| 28 | Shell surface |
| 29 | Shell surface |
| 30 | Projection |
| 31 | Axial direction |
| 32 | Flow arrow |
| 33 | Stroke |
| 34 | Zero position |
| 35 | Pocket |
| 36 | Axial extension |
| 37 | Radial extension |
| 38 | Longitudinal extension |
| 39 | Transverse extension |
| 40 | Longitudinal extension |
| 41 | Opening angle |
| 42 | End face |
| 43 | Width |
| 44 | Connecting passage |
| 45 | Radial |
| 46 | Remote end |
| 47 | Cut-out |
| 48 | Flow rate |
| 49 | Control line |
| 50 | First section |
| 51 | Second section |

The invention claimed is:

1. A fire extinguishing apparatus comprising a flow rate measurement device and an additive metering valve, wherein the flow rate measurement device is configured to control the additive metering valve in the fire extinguishing apparatus and for detecting a flow rate of an extinguishing agent, the flow rate measurement device comprising a control element arranged on a control rod, which control element has a conical section, and a housing surrounding the control element, which housing comprises a hollow cylindrical control element seat at least in a contact section with the control element, the control element being received in the housing so as to be displaceable in an axial direction of the control rod, the position of the control element essentially depending on how much extinguishing agent is flowing through the flow rate measurement device, wherein the positioning of the control element relative to the housing is therefore directly correlated with an extinguishing agent flow rate, wherein the control element further comprises a cylindrical subsection which is positioned downstream of the conical section as viewed in a flow direction of the fluid to be measured, and which cylindrical subsection is adapted in terms of its cross-sectional contour to the hollow cylindrical control element seat so that the cylindrical subsection of the control element can be pushed into the hollow cylindrical control element seat without a gap, and in which cylindrical subsection of the control element at least one recess is also provided, which interrupts shell surfaces of the conical section and the cylindrical subsection of the control element, wherein the flow rate measurement device is configured such that in the event of an increased flow rate, the cylindrical section of the control element is lifted completely out of the control element seat, wherein the flow rate measurement device and the additive metering valve are configured such that in the additive metering valve, a quantity of an additive to be mixed to the extinguishing agent being conveyed in the flow rate measurement device is metered on a basis of an actual position of the control element and a desired proportion as a percentage of the additive to be mixed with the extinguishing agent being conveyed in the flow rate measurement device, wherein due to the at least one recess in the control element, when the cylindrical section of the control element is not lifted completely out of the control element seat, a change in the extinguishing agent flow rate results in a movement of the control element over a first distance, and when the control element is lifted completely out of the control element seat, the same change in the extinguishing agent flow rate results in a movement of the control element over a second distance, wherein the second distance is smaller than the first distance.

2. The fire extinguishing apparatus according to claim 1, wherein the at least one recess comprises a pocket extending parallel with the axial direction of the control rod.

3. The fire extinguishing apparatus according to claim 1, wherein at least two diametrically opposite recesses are provided.

4. The fire extinguishing apparatus according to claim 1, wherein the cylindrical subsection directly adjoins the conical section.

5. The fire extinguishing apparatus according to claim 1, wherein the control element comprises a head section adjoining the cylindrical subsection, the head section comprising a wider region, wherein the head section restricts a degree to which the control element can be pushed into the control element seat.

6. The fire extinguishing apparatus according to claim 1, wherein a longitudinal extension of the cylindrical subsection of the control element is between 5% and 20% of a transverse extension of the cylindrical subsection of the control element.

7. The fire extinguishing apparatus according to claim 1, wherein a longitudinal extension of the conical section of the control element is between 100% and 200% of a longitudinal extension of the cylindrical subsection.

8. The fire extinguishing apparatus according to claim 1, wherein the control element is fixed to the control rod.

9. The fire extinguishing apparatus according to claim 1, wherein an opening angle of the conical section is between 70° and 130°.

10. The fire extinguishing apparatus according to claim 1, wherein the at least one recess occupies between 5% and 60% of an unwound length of the cylindrical subsection on the control element.

11. The fire extinguishing apparatus according to claim 1, wherein an axial extension of a recess of the at least one recess in the cylindrical subsection is more or less the same size as a radial extension of this recess.

12. The fire extinguishing apparatus according to claim 1, wherein the at least one recess forms a connecting passage between the conical section and the cylindrical subsection of the control element.

13. The fire extinguishing apparatus according to claim 12, wherein the connecting passage is radially open towards an end remote from the control rod.

14. The fire extinguishing apparatus according to claim 1, wherein the at least one recess forms a connecting passage having sections extending radially and axially with respect to the control element.

15. The fire extinguishing apparatus according to claim 1, wherein the fire extinguishing apparatus further comprises: a water intake line, an additive intake line, an extinguishing agent discharge line and a pump.

16. A fire extinguishing apparatus comprising a flow rate measurement device and an additive metering valve, wherein the flow rate measurement device is configured to control the additive metering valve in the fire extinguishing apparatus and for detecting a flow rate of an extinguishing agent, the flow rate measurement device comprising a control element arranged on a control rod, which control element has a substantially conical section, and a housing surrounding the control element, which housing comprises a hollow cylindrical control element seat at least in a contact section with the control element, the control element being received in the housing so as to be displaceable in an axial direction of the control rod, the position of the control element essentially depending on how much extinguishing agent is flowing through the flow rate measurement device, wherein the positioning of the control element relative to the housing is therefore directly correlated with an extinguishing agent flow rate, wherein the control element further comprises a cylindrical subsection which is positioned downstream of the conical section as viewed in a flow direction of the fluid to be measured, and which cylindrical subsection is adapted in terms of its cross-sectional contour to the hollow cylindrical control element seat so that the cylindrical subsection of the control element can be pushed into the hollow cylindrical control element seat without a gap, and in which cylindrical subsection of the control element at least one recess is also provided, which interrupts shell surfaces of the conical section and the cylindrical subsection of the control element, wherein the flow rate measurement device is configured such that in the event of an increased flow rate, the cylindrical section of the control element is lifted completely out of the control element seat, wherein the flow rate measurement device and the additive metering valve are configured such that in the additive metering valve, a quantity of an additive to be mixed to the extinguishing agent being conveyed in the flow rate measurement device is metered on a basis of an actual position of the control element and a desired proportion as a percentage of the additive to be mixed with the extinguishing agent being conveyed in the flow rate measurement device, wherein due to the at least one recess in the control element, when the cylindrical section of the control element is not lifted completely out of the control element seat, a change in the extinguishing agent flow rate results in a movement of the control element over a first distance, and when the control element is lifted completely out of the control element seat, the same change in the extinguishing agent flow rate results in a movement of the control element over a second distance, wherein the second distance is smaller than the first distance.

* * * * *